Oct. 28, 1930.   J. J. SULLIVAN   1,779,921
INTERNAL COMBUSTION ENGINE
Filed April 5, 1927   6 Sheets-Sheet 4

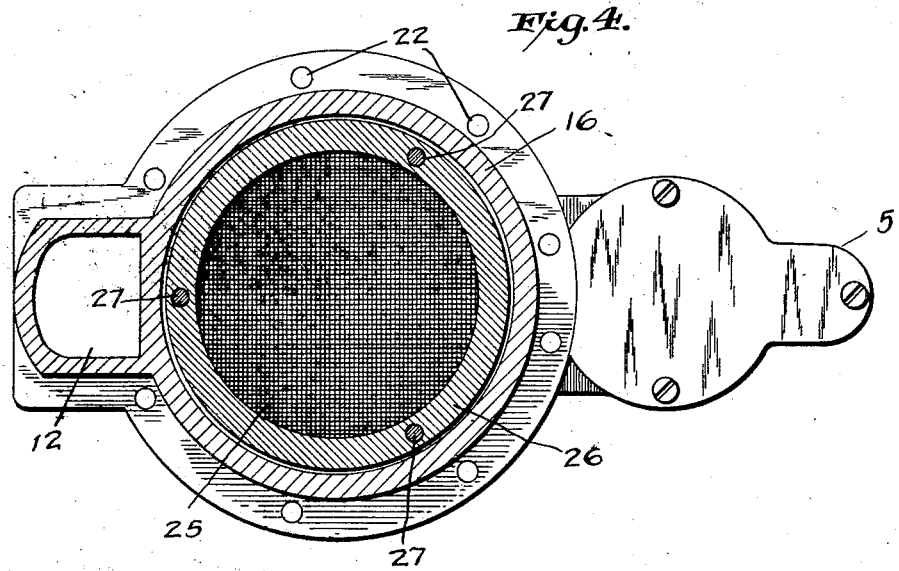
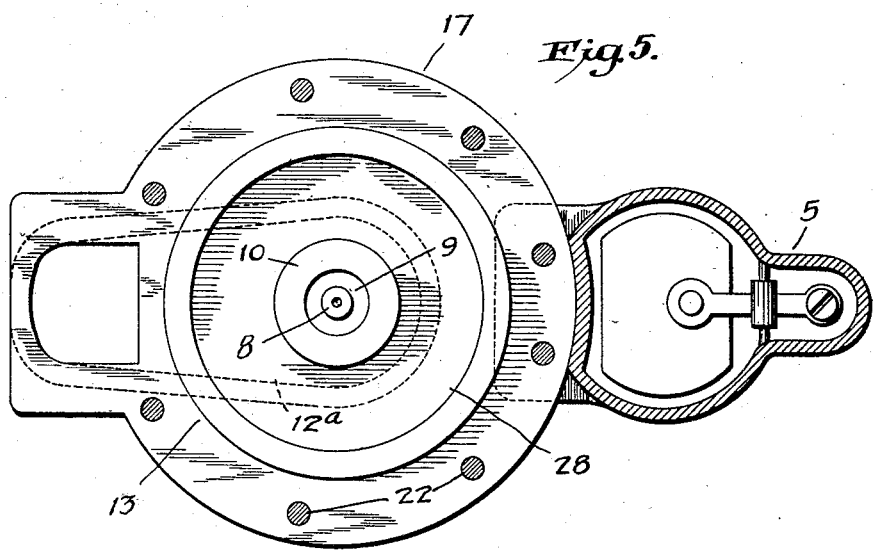
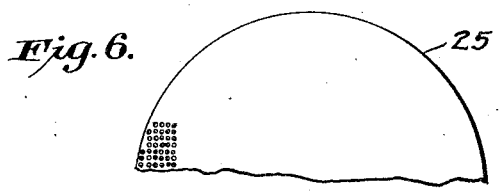

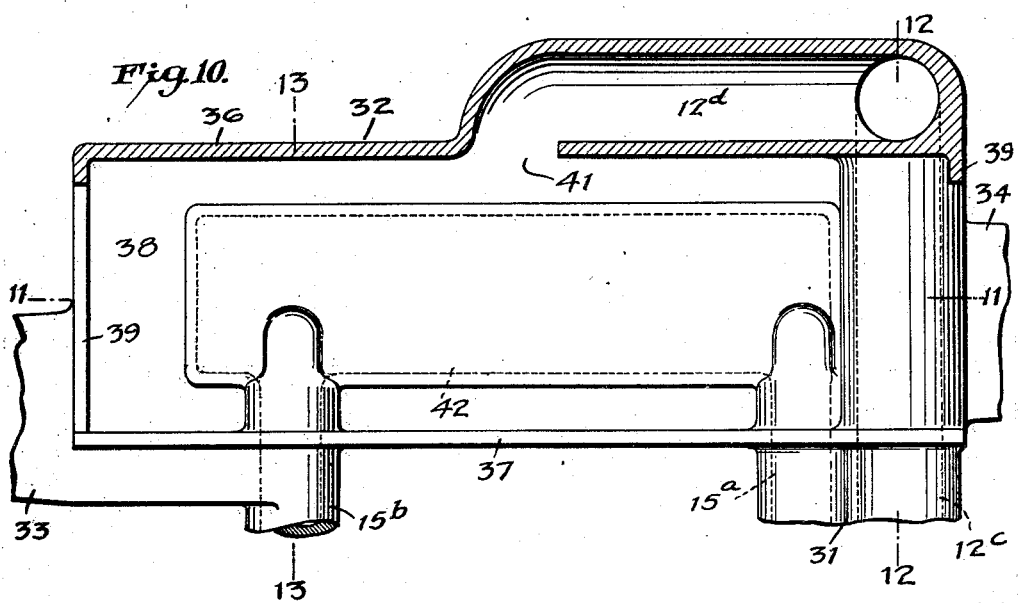
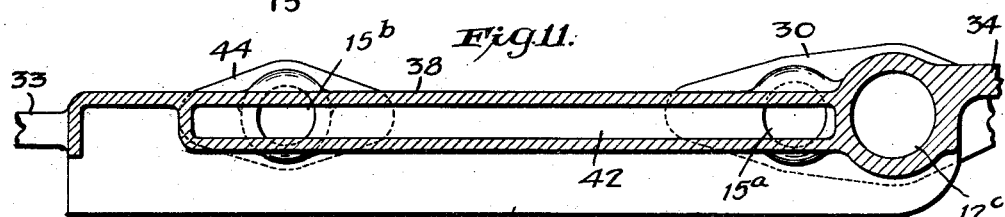
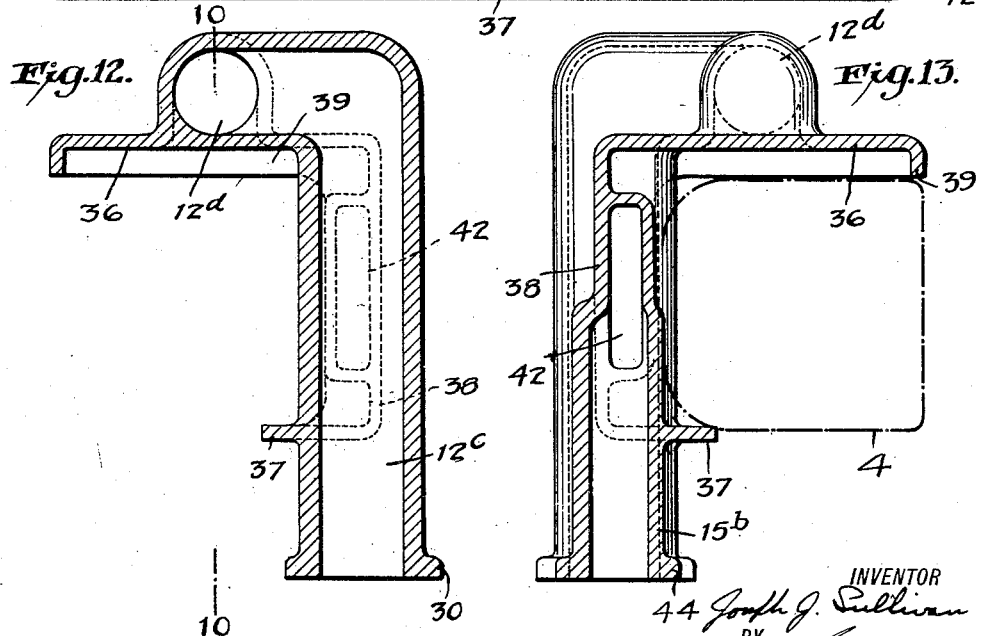

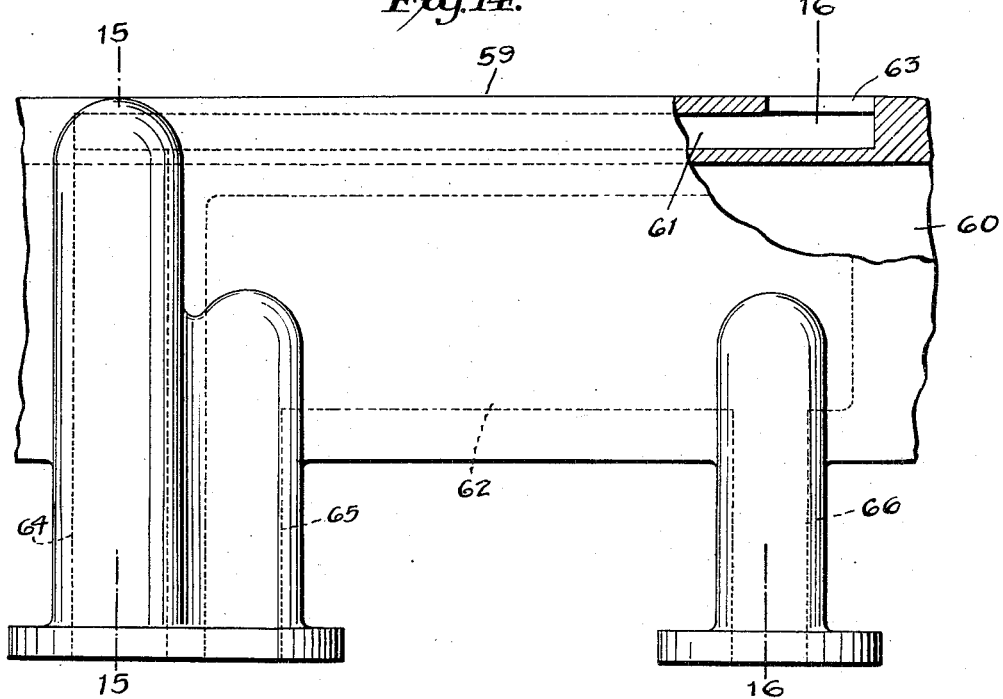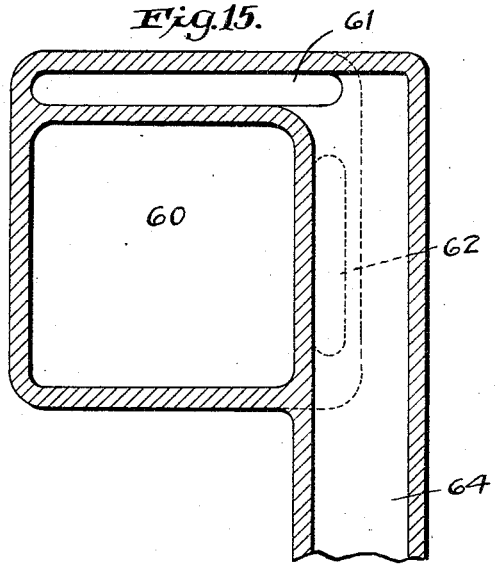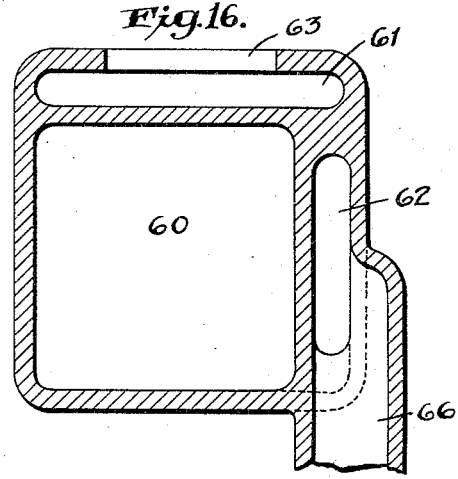

Patented Oct. 28, 1930

1,779,921

UNITED STATES PATENT OFFICE

JOSEPH J. SULLIVAN, OF ASTORIA, NEW YORK, ASSIGNOR TO SULLIVAN VAPORIZER CORPORATION, OF ASTORIA, LONG ISLAND, A CORPORATION OF NEW YORK

INTERNAL-COMBUSTION ENGINE

Application filed April 5, 1927. Serial No. 181,017.

The invention has to do with method and apparatus for preparing, conducting and heating the charges of internal combustion engines designed to operate under fluctuating loads. The objects are to increase the efficiency of the engine, to cause it to accelerate promptly and smoothly without knock, to overcome the defect of liquid portions of the gasoline or other hydrocarbon fuel being carried into or deposited in the cylinders or intake manifold, and to accomplish these results in a simple and practical manner.

In the accompanying drawings forming part hereof:

Figure 1:
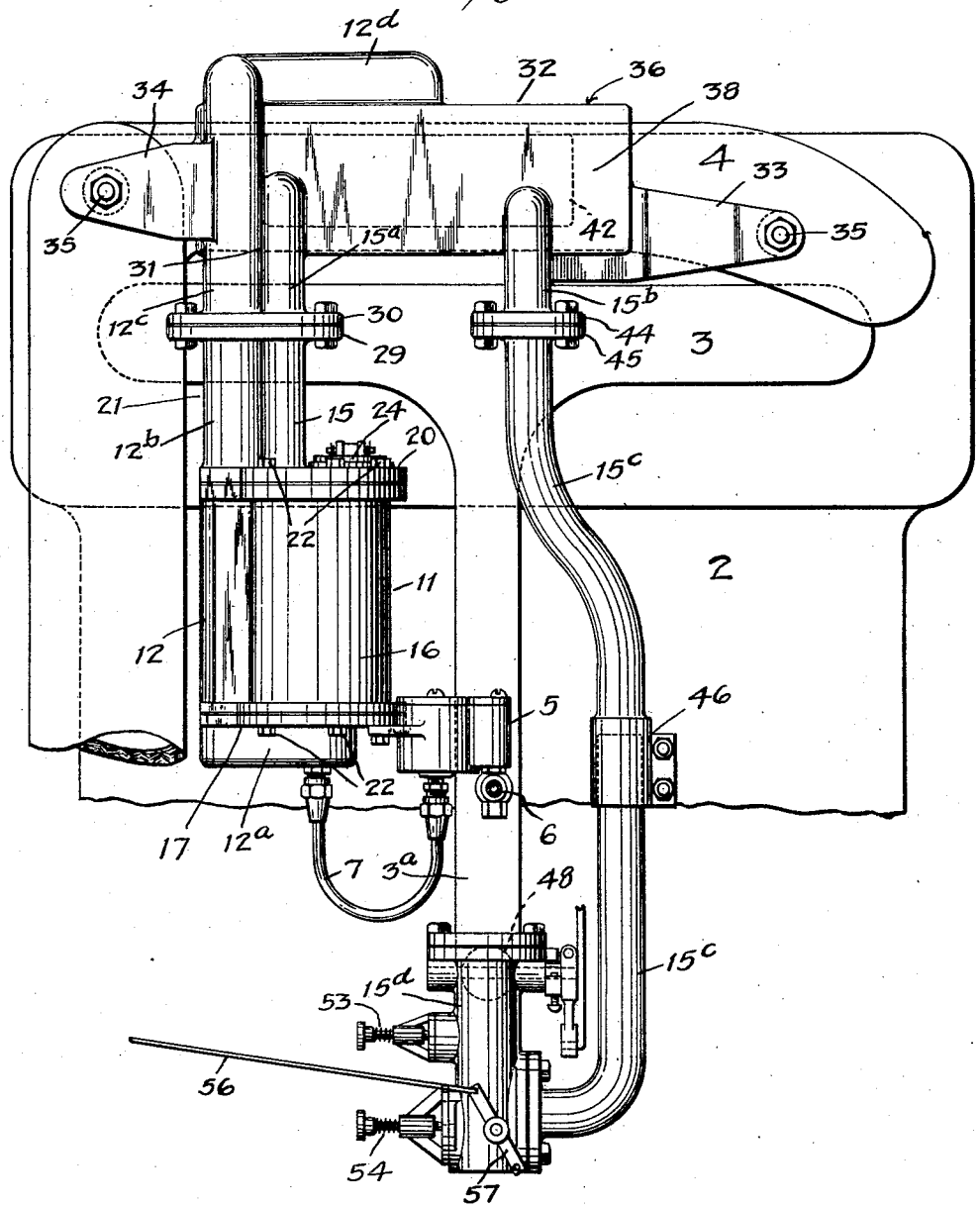
Fig. 1 is a side elevation of an automobile engine with the invention applied thereto.
Figure 2:
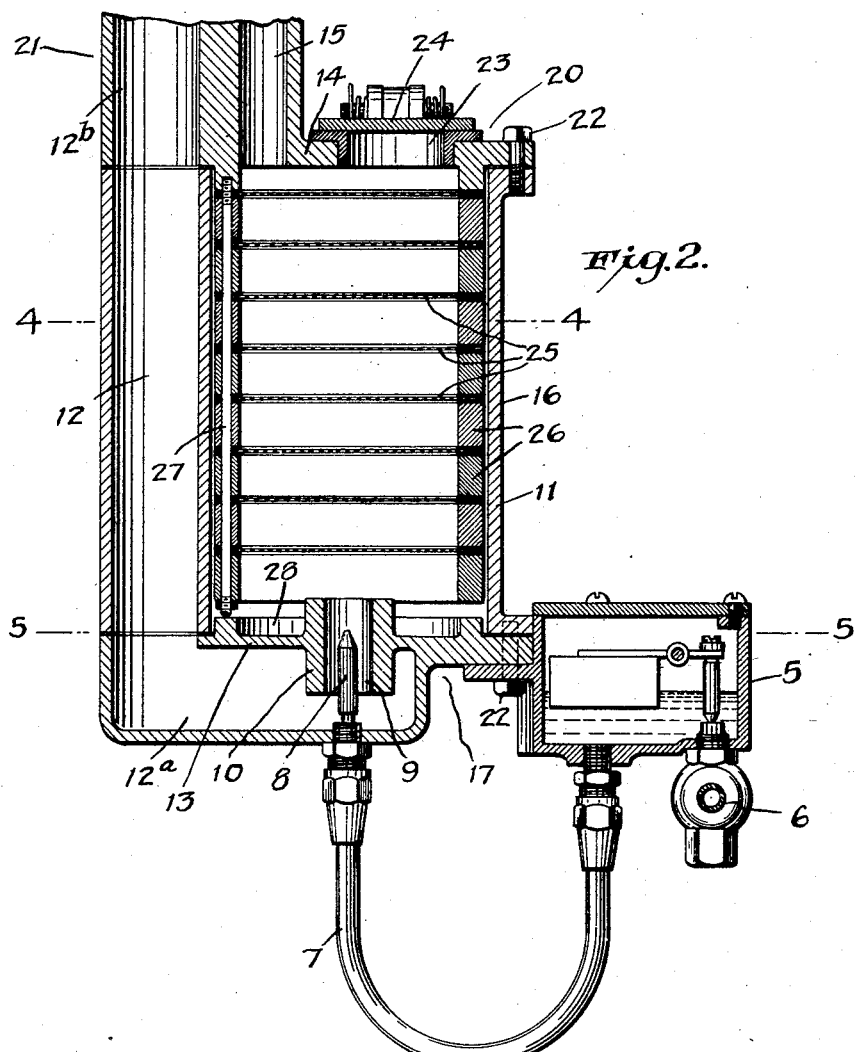
Fig. 2 is a vertical section through the carburetting part of the apparatus, the section being taken on the line 2—2 of Fig. 3.
Figure 3:
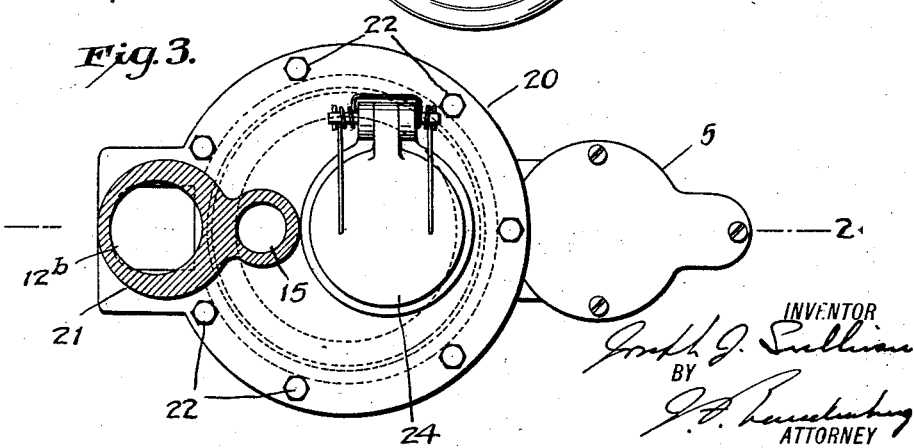
Fig. 3 is a plan view of Fig. 2, showing the upper conduits in section.
Figure 7:
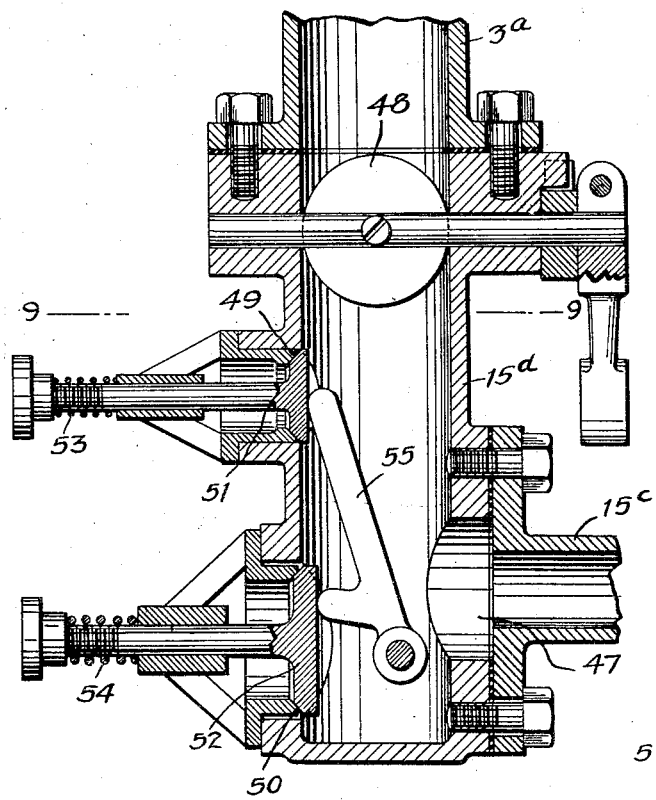
Figure 8:
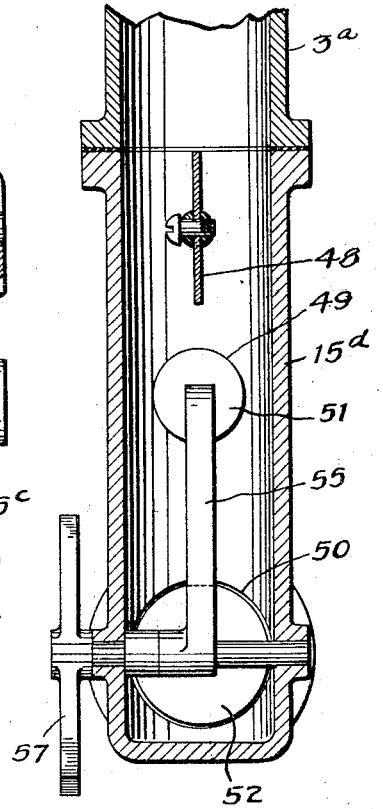
Figure 9:
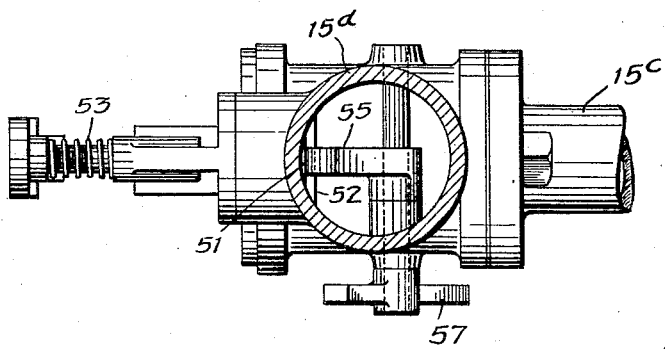

Figs. 4 and 5 are horizontal sections taken on the lines 4—4 and 5—5, respectively, of Fig. 2;

Fig. 6 is a detail of a portion of one of the foraminous baffles, illustrating only a part of the small perforations which extend throughout the plate;

Fig. 7 is a vertical section through the portion of the device containing the secondary air inlets and the throttle valve;

Fig. 8 is a vertical section taken in a plane at right angles to Fig. 7;

Fig. 9 is a horizontal section on the line 9—9 of Fig. 7;

Fig. 10 is a vertical longitudinal section through the form of heater attached to the exhaust manifold shown in Fig. 1, the section being taken on the line 10—10 of Fig. 12;

Fig. 11 is a horizontal section taken on the line 11—11 of Fig. 10;

Figs. 12 and 13 are vertical transverse sections taken on the lines 12—12 and 13—13 of Fig. 10;

Fig. 14 is an elevation, with portions broken away and in section, of an integral exhaust manifold member having the heating passages or chambers formed therein; and Figs. 15 and 16 are vertical transverse sections taken on the lines 15—15 and 16—16 of Fig. 14.

The engine block is marked 2, and the intake and exhaust manifolds serving the several power cylinders are marked 3 and 4, respectively.

A float chamber 5, of the kind familiar in carbureters, is connected by a conduit 6 with the fuel tank and by a pipe 7 with a spray nozzle 8, which stands in the aspirating air passage 9 of a tubular part 10 at the bottom of an upright cylindrical chamber 11, the area of which is large as compared with the air passage 9. A passage 12, of ample area, extends downward at one side of the chamber 11, thence across and beneath the bottom plate or wall 13 of the chamber into communication with the aspirating passage 9. The passage 12 conducts heated air to the carburetting or proportioning device, and is in heat transferring relation to the chamber 11 and the plate 13, so as to communicate heat to these parts. From the top 14 of the chamber there extends a passage 15 for conducting the mixture from the chamber.

This part of the apparatus is advantageously made in three main sections, each an integral casting. The middle section 16 forms the side walls of the chamber 11 and includes a section of the heated air passage 12, the walls of this passage being in one piece with the wall of the chamber so as to supply heat to the chamber by conduction and radiation as well as by the heat conveyed by the air itself when it enters the chamber. The lower section 17 includes the bottom plate 13 of the chamber 11 and the transverse lower portion 12$^a$ of the air conduit, this conduit section being in one piece with the plate 13 and the tube 10. The upper section 20 is a casting, forming the top of the chamber, having an integral upward extension 21 containing the offtake passage 15 and the upper portion 12$^b$ of the air passage 12. These sections are detachably secured together by screws 22, so that they can be readily taken apart and access had to all portions.

A vent opening 23 is provided in the top of the chamber 16, this opening being normally closed by a spring-pressed flap valve 24, which would yield to the pressure of a backfire or similar condition to vent the same to the atmosphere.

The chamber 11 contains a series of foraminous baffles 25 spaced one above the other and extending across the interior. These baffles or screens, which are schematically illustrated in Figs. 2 and 4, are best made of thin metal plates of non-corroding material containing multitudinous small perforations, close together but with solid areas of the plate between them. I found plates having perforations about twenty one-thousandths of an inch in diameter and six hundred and twenty-five of them to the square inch throughout the plate to give very satisfactory results, but it will be understood that this admits of variation. The openings should be quite small, but not so fine as to clog readily. The benefits of these foraminous baffles might be realized to an extent by the use of special mesh screens, but perforated metal plates act more advantageously. The plates are clamped between rings 26, sufficiently smaller than the interior of the chamber 16 so as to slip in and out readily, and are connected together to form one unit by bolt rods and nuts 27, which preferably secure the unit to the top section 14 so that the collection of plates and spacers is removable with this section.

The central vertically directed blast of air, carrying with it small drops and vapor taken from the nozzle 8, passes upward through the succession of foraminous baffles. The vaporizing of the liquid fuel in the heated air is thus promoted, and the heavy portions of the fuel which are not ordinarily vaporized and which in ordinary practice are carried through and deposited in the intake manifold and in the power cylinders, to the detriment of the operation of the engine, are restrained or knocked back. Some of these portions find their way downward, and are collected upon the heated bottom plate 13, which is preferably formed with a collecting basin 28 surrounding the upward projection of the tube 10 and having a diameter approximately the diameter of the plates 25 inside of the cylinder formed by the spacer rings 26. Here these "heavy ends" of fuel are evaporated by conduction and radiation in the presence of the heated air and mixture in the chamber. The "heavy ends" or other unvaporized particles are primarily caught and evaporated on the surfaces of the foraminous baffles or screens, which also become heated.

The form of the blast as it rises and spreads through the plates is naturally modified by reason of the fact that the offtake passage 15, as illustrated, is eccentric to the axis, this arrangement being advantageous for purposes of heat transfer and also for strength and simplicity, since it enables the conduit 15 and the upper section of the conduit 12 to be cast in one stout piece, which can serve to support the structure as a whole from the part above. It will be understood, however, that the conduit 15 does not have to be out of line with the tube 10.

The section 21 is formed at its upper end with a flange 29, which is detachably bolted to a flange 30 on the lower end of a downwardly projecting connection extension 31, containing a section $12^c$ of the heated air passage and a section $15^a$ of the mixture offtake passage. The extension 31 forms an integral part of a heater 32, which in the form shown in Figs. 1, 10, 11, 12 and 13 is made of a casting which fits over the top and against the outer side of the exhaust manifold 4, but which, as shown in Figs. 14, 15 and 16, may be incorporated in the exhaust manifold casting itself. The form of the heater shown in Fig. 1 is designed for attachment to existing exhaust manifolds, and is provided with end brackets 33 and 34, having holes to receive bolts or screws 35 positioned to enter existing socket lugs on the manifold.

The roof 36 of this heater overhangs and preferably rests on the top of the manifold and an internal ledge 37 at the bottom of the side portion 38 may abut against or engage under the manifold. The heater has other internal peripheral flanges 39 to abut or approach the manifold, forming a hood or jacket including between it and the hot manifold an air space of substantial volume but of little depth wherein the air becomes highly heated by radiation and conduction. The flanges of the heater do not fit closely against the manifold at all points, so that outside air is free to enter beneath the edges of the hood.

The section $12^c$ of the hot air passage is carried upward in the walls of the heater casting to the top thereof, where it is preferably extended horizontally at $12^d$ to about the middle of the length of the roof of the heater, where it communicates with the confined air space through an opening 41.

The offtake conduit section $15^a$ opens into one end of a horizontally narrow, vertically widened chamber 42 formed in the side wall of the heater touching or adjacent the wall of the exhaust manifold, and from the opposite end of this chamber an integral conduit connection $15^b$ projects downward from the wall, and is provided with a terminal attachment flange 44. This flange meets another flange 45 on the upper end of a pipe $15^c$, which is advantageously made in two sections connected by a telescopic clamp joint 46 allowing for vertical adjustment of the lower part of the pipe. The lower end of this conduit is bolted to the inlet 47 of a casting $15^d$ forming a section of the power mixture conduit. This member, which may be of generally cylindrical form, disposed vertically and having its inlet in its lower portion, contains the throttle valve 48 by means of which the supply of power mixture to the engine is metered by the operator, or in some cases automatically, in accordance with the work to be performed.

The wall of the body 15$^d$ also contains one and most advantageously two, or a plurality of, secondary air inlets 49, 50, commanded by automatic valves 51, 52 which are urged to closed positions by springs 53, 54, or otherwise loaded. These valves are adapted to open inward under the partial vacuum produced by the pistons of the engine cylinders on their intake strokes. The valve 51, which is desirably located above the valve 52, between the same and the throttle, has a small or moderate area, which is considerably smaller than the area of the power mixture passage, and its spring is comparatively light, this valve being so designed as to be kept open more or less under all engine-running conditions, except at starting, when this valve may be held closed. The valve 52 is of large or larger area, approaching the area of the power mixture passage, and its spring 54 is much more powerful than the spring 53, not only taking into account the larger area of the valve 52, but still stronger so that the valve 52 will remain closed or substantially closed when the engine is idling or operating at low speed, and will open under ordinary conditions or at high speed, more or less according to requirements, to supply larger quantities of additional air. It is important that the secondary air inlet is below the throttle, that is to say, the throttle is between such inlet and the intake of the engine.

An arm 55, pivoted in the body 15$^d$ and operated from the dash of the car or other suitable point through a link 56 and crank 57, can be operated at starting to press against the valves 51, 52 on the inside and hold them closed when starting the engine cold, a very rich mixture then being supplied to the power cylinders.

The upper end of the body 15$^d$ is flanged and bolted to the lower end of the uptake limb 3$^a$ of the intake manifold 3. The area of the passage in the body 15$^d$ is larger than the area of the passage of the conduit 15$^c$ leading thereto in order to allow for the increased volume due to the addition of air past the valves 51, 52. I also find that it is important that the area of the passage 12$^d$, 12$^c$, 12$^b$, 12, 12$^a$ which conducts hot air to the spray nozzle 8 and tube 10 be quite large, very much larger than the area of the aspirating passage 9 through the tube, and larger also than the vapor offtake passage 15.

In ordinary carbureters and carburetting apparatus all of the air required for the operation of the engine is taken through the carbureter. In the present invention only a part, and considerably less than the whole, of the air required for the engine is taken past the spray nozzle, or enters into the mixture at a point before this mixture is reheated in the chamber 42, and the carburetting part of the apparatus and its passages are designed in accordance with this plan. Consequently, a part of the air, previously heated, takes up all the fuel that the engine requires, and this heated very rich mixture, somewhat reduced in temperature by the vaporization of the fuel, is again heated. In this way, and helped by the fact that the foraminous baffles 25 promote commingling and hold or knock back and evaporate the heavy hydrocarbon constituents, the fuel becomes thoroughly vaporized and the mixture is made dry before the balance of the air for normal operation is automatically admitted to the charges, this admission being at a point before the throttle or metering means is reached.

This secondary or complementary air is preferably substantially cold or unheated, or at a temperature considerably below that of the heated mixture, being taken, in the illustrated embodiment, direct from the outside atmosphere. (Naturally this air beneath the hood of an automobile will be warmed to some extent.) The effect of the substantially cold air added to the mixture is to reduce the temperature of the whole so that the charges drawn into the engine cylinders are much less rarefied than they would be if all the air were heated to the same degree; consequently the engine will have more power. The addition of cold air below the throttle does not cause precipitation because by this time the fuel has become perfectly vaporized and commingled with the air; in addition to which the increase in the proportion of air to fuel lowers the saturation point for a given temperature.

The combined exhaust manifold and heater 59 illustrated in Figs. 14 to 16 consists of a single, hollow casting enclosing the passage 60 for the hot products of combustion passing from the engine, and formed in the thickness of its top and outside lateral walls with broad, shallow heating spaces 61 and 62.

The space 61 has an opening 63 to the atmosphere at one point, and at a remote point it communicates with a downtake passage 64, which corresponds to the conduit section 12$^c$ of Fig. 1. The chamber 62 communicates with an uptake passage 65 and a downtake passage 66, corresponding, respectively, to the passages 15$^a$ and 15$^b$ of Fig. 1. It will be understood, of course, that the directions in which the various passages extend in space are determined by the environment, and may be varied.

Numerous changes may be made without departing from the invention. The claims are intended to cover the generic and specific aspects of the invention and all statements of matters falling therebetween. In some cases a type of carburetting device other than a spray device may be employed.

What I claim as new is:

1. In connection with an internal combustion engine designed to operate under fluctuating loads, the combination of carburetting means comprising a nozzle for admission of liquid fuel, an air inlet associated therewith and designed to admit a part only of the air required for the operation of the engine, means for heating this part of the air, a chamber above said nozzle and air inlet, a plurality of foraminous baffles in said chamber adapted to restrain unvaporized portions of the fuel, means for catching and evaporating said heavy fuel portions in the presence of said air, a conduit leading from said chamber, an automatic valve controlled secondary air inlet for admitting relatively cold air to said conduit to make up the balance of the air required for the operation of the engine, and a throttle between said secondary air inlet and the engine intake.

2. In an internal combustion engine designed to operate under fluctuating loads, the combination of carburetting means comprising a nozzle for admission of liquid fuel, an air inlet associated therewith and designed to admit a part only of the air required for the operation of the engine, means for heating this part of the air sufficiently to form a hot mixture of air and fuel vapor, means providing a large heated chamber above said nozzle and air inlet, means comprising a plurality of foraminous baffles in said chamber for separating and evaporating heavy or unvaporized portions of the fuel in the presence of said hot mixture, a conduit leading from said chamber, an automatic valve-controlled secondary air inlet for admitting air to said conduit to make up the balance of the air required for the operation of the engine, and a throttle between said secondary air inlet and the engine intake.

3. In an internal combustion engine designed to operate under fluctuating loads, the combination of carburetting means comprising a nozzle for admission of liquid fuel, an air inlet associated therewith and designed to admit a part only of the air required for the operation of the engine, means for heating this part of the air sufficiently to form a hot mixture of air and fuel vapor, means providing a large heated chamber above said nozzle and air inlet, means comprising a plurality of foraminous baffles in said chamber for separating and evaporating heavy or unvaporized portions of the fuel in the presence of said hot mixture, a conduit leading from said chamber, a plurality of differential valve-controlled secondary air inlets for admitting air to said conduit to make up the balance of the air required for the operation of the engine, springs of differential effect holding said valves to their seats to open at different degrees of suction, and a throttle between said secondary air inlet and the engine.

4. In an internal combustion engine designed to operate under fluctuating loads, vaporizing and carburetting means having a nozzle for admission of liquid fuel, an air inlet associated with said nozzle, means for heating the air passing to said inlet sufficiently to form a hot mixture of air and fuel vapor, means forming a large chamber above said nozzle and air inlet, and a plurality of foraminous baffles in said chamber adapted to separate and evaporate heavy or unvaporized portions of the fuel in the presence of the hot mixture.

5. In an internal combustion engine designed to operate under fluctuating loads, vaporizing and carburetting means having a nozzle for admission of liquid fuel, an air inlet associated with said nozzle, means for heating the air passing to said inlet sufficiently to form a hot mixture of air and fuel vapor, means forming a large chamber above said nozzle and air inlet, a plurality of foraminous baffles in said chamber adapted to separate and evaporate heavy or unvaporized portions of the fuel in the presence of the hot mixture, and a heated underlying surface for catching and evaporating heavy fuel portions also in the presence of the hot mixture.

JOSEPH J. SULLIVAN.